United States Patent Office 3,494,061
Patented Feb. 10, 1970

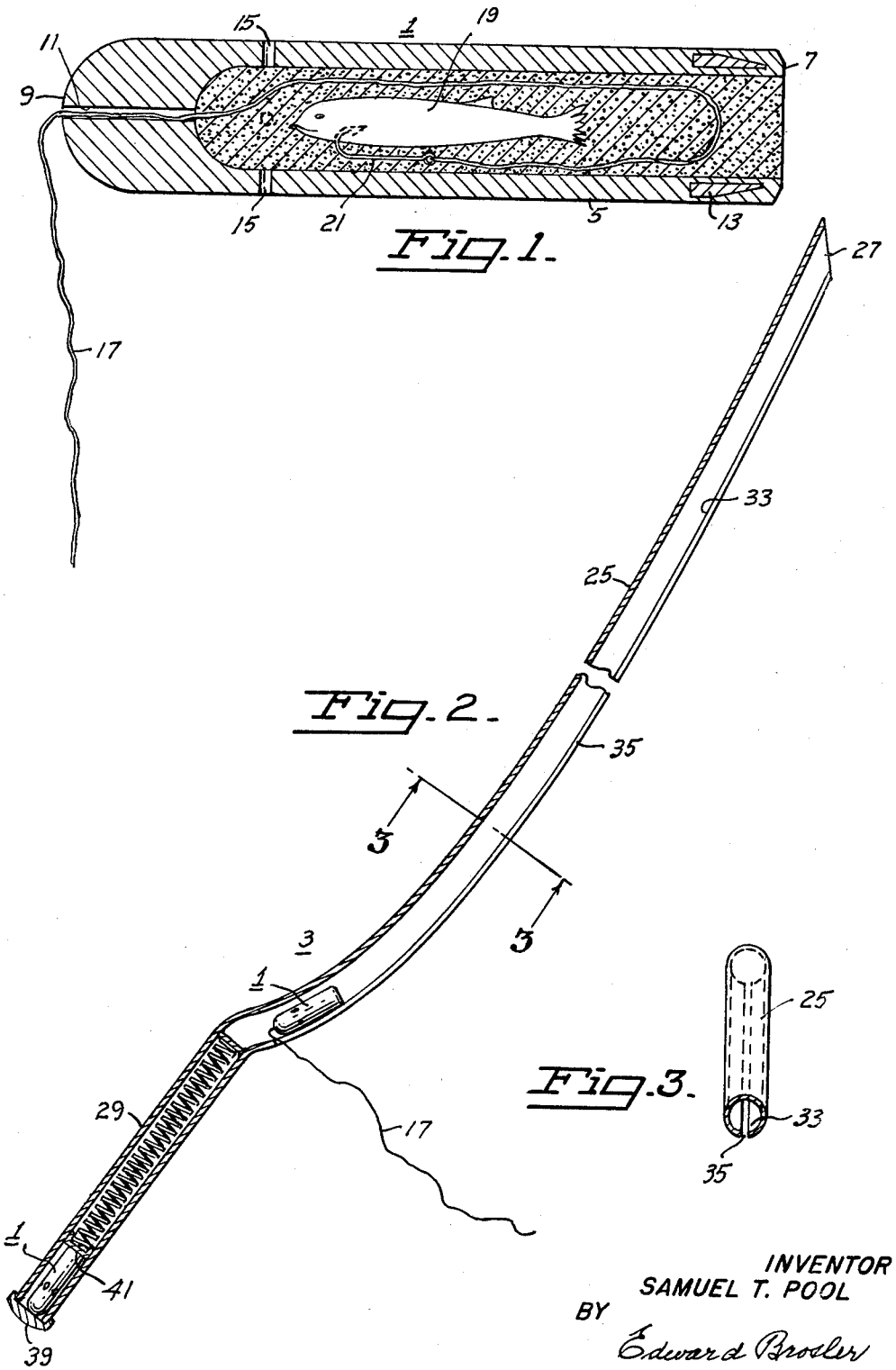

3,494,061
BAIT CASTING APPARATUS
Samuel T. Pool, Sacramento, Calif.
(P.O. Box 1102, Gonzales, La. 70737)
Filed June 27, 1967, Ser. No. 649,198
Int. Cl. A01k 91/02
U.S. Cl. 43—19                                6 Claims

ABSTRACT OF THE DISCLOSURE

A bait casting assembly involving, in its preferred form, a longitudinally curved channel or barrel having a handle at one end and being open at the other end. The channel or barrel is used to centrifugally cast an appropriate cartridge a substantial distance into the water. The cartridge has live, dead, or artificial bait, releasably packed therein which is attached to the end of a fishing line stored on the reel of a fishing pole.

---

My invention relates to fishing tackle, and more particularly, to apparatus to be used in conjunction with conventional fishing tackle, to enable casting of lightweight bait for long distances.

In casting lightweight bait, distance is difficult to attain, in spite of the use of long fishing poles; and when fishing from shore, the ability to cast for substantial distances is a practical necessity, and particularly when the water inshore is shallow.

Among the objects of my invention are:

(1) To provide a novel and improved bait casting assembly enabling one to cast lightweight bait for long distances;

(2) To provide a novel and improved bait casting assembly independent of but for use in conjunction with conventional tackle, to effect long-distance casting of bait, even though the bait be of light weight;

(3) To provide a novel and improved cartridge as a component of my improved bait casting assembly, which adds weight to the bait for casting purposes, and takes on added functions upon settling in the water; and (4) To provide a novel and improved casting device in the form of a throwing arm for use in the casting of such cartridge for long distances.

Additional objects of my invention will be brought out in the following description of a preferred embodiment of the same, taken in conjunction with the accompanying drawings, wherein:

FIGURE 1 is an enlarged longitudinal view in section through a cartridge, constituting an important component of my invention.

FIGURE 2 is a longitudinal view in section through a bait casting device for use with the cartridge of FIGURE 1.

FIGURE 3 is a view in section taken substantially in the plane 3—3 of FIGURE 2.

Referring to the drawings for details of my invention in the preferred form, the cartridge 1 of FIGURE 1, forming an important component of the invention, has, for one of its primary functions, to increase the effective weight of bait, and to permit of the casting of such bait for substantial distances. To attain such distances, I provide, as another component of the invention, a casting device 3 such as depicted in FIGURE 2, enabling one to centrifugally cast the cartridge substantial distances.

The cartridge is in the form of a hollow tube 5, preferably of molded plastic, or other floatable material, open at one end 7, with the opposite or closed end 9 provided with an axial passage 11 therethrough.

At its open end, the cartridge is weighted, preferably by a concentric or annular metal ring 13 molded into the well of the tube.

Adjacent the closed end, are wall openings or holes 15 communicating with the interior of the cartridge or cartridge chamber, the specific number, size, or shape of such holes not being critical.

The cartridge is for use with conventional fishing tackle, such as a fishing pole and reel, and when put to use, the cartridge is threaded onto the fishing line 17 with its open end facing away from the pole, on whose reel the line is stored. To the free end of the line, the bait 19 is atttached in any conventional manner. If live or dead bait is employed, it will be attached to a hook 21, and if an artificial lure is used, it will be tied to the line.

At this stage, the bait, with some slack line, is packed in the cartridge chamber, wet sand being preferably used for the purpose, primarily because it is apt to be readily available, and, when using live bait, it will permit maintenance of life, at least for the time required in effecting a cast, whereby the live bait will remain alive after entering the water.

When thus packed, the bait, regardless of its light weight, has been effectively increased in weight to a value permitting a casting of the same for substantial distances.

To effect such long casts, I provide the casting device of FIGURE 2, preferably in the form of a throwing arm, involving a cartridge holding and guiding channel 25 open at one end 27 to permit discharge of the cartridge, and at its other end terminating in a handle 29 of sufficient length to be grasped by both hands and permit of a wide swing of the device for casting purposes.

The channel is curved along substantially a portion of a spiral, with the portion of smallest radius adjacent the handle, and when thus curved, it provides a centrifugal guide surface 33 against which the cartridge will slide in response to a swing of the throwing arm, the cartridge being thus centrifugally discharged and with great force.

Though the channel may be fabricated from wire or reed, I prefer, from the viewpoint of simplicity and lower cost of manufacture, to form the channel of tubing, either metal or plastic, and include the handle as an integral part thereof. When so formed, a longitudinal slot 35 is provided in the guide wall of the channel, extending from the open end, to a point adjacent the handle, to permit passage of the line 17 and free movement thereof with the cartridge 1 during discharge of such cartridge from the channel.

In loading the cartridge into the casting device, it is inserted through the open end of the channel, with the weighted end facing out, to cause the cartridge to emerge with the weighted end first. Preparatory to a cast, the fishing pole is stabilized with its handle end buried in the shore soil or sand, or otherwise maintained in its upright position. Then, with the cartridge loaded into the casting device, it is discharged to a substantial distance off shore by a sudden swing of the casting arm, in the course of which the fishing line will be withdrawn from the reel. With such apparatus, I have been able to cast lightweight bait to distances in excess of two hundred feet.

Upon striking the water, the cartridge will float with the weighted end submerged, the weight being preferably though not necessarily, sufficient to bring the holes under water, whereby the penetration of water into the chamber from both ends will loosen and free the sand and release the bait from the cartridge, the slack line enabling the bait to freely exit from the cartridge chamber, and effect additional withdrawal of line from the reel under proper conditions.

The handle 29 is preferably hollow to function as a storage chamber for additional cartridges, which may be of different sizes to accommodate bait of different sizes. When used as a storage chamber, the chamber is closed by a cap 39 and the stored cartridges are stabilized by a spring-biased piston 41.

What is claimed is:
1. A bait casting assembly comprising in combination a longitudinally curved channel member open at one end and at its other end, terminating in a handle, and a cartridge slidably receivable in said channel member, and adapted to be centrifugally cast therefrom, said cartridge being hollow and adapted for threading onto a fishing line and carrying bait therein.
2. A bait casting assembly in accordance with claim 1, characterized by said channel member being in the form of an elongated tubular element of a diameter capable of slidably receiving said cartridge, said tubular element including an elongated slot extending from its open end to a point approaching said handle.
3. The structure claimed in claim 2 in which said channel member is curved along substantially a portion of a spiral, with the smallest radius of such curve being at the handle end.
4. A bait casting device comprising an elongated channel member, open at one end and at its other end terminating in a handle, said channel member being curved longitudinally along substantially a portion of a spiral, with the smallest radius of such curve being at the handle end, characterized by said channel member being substantially tubular and uniform in cross-section.
5. A bait casting device in accordance with claim 4, characterized by said tubular channel member having a slot in its outermost portion and extending from its open end to a point approaching said handle.
6. A bait casting device comprising an elongated channel member, open at one end and at its other end terminating in a handle, said channel member being curved longitudinally along substantially a smooth curve, characterized by said channel member being substantially tubular and uniform in cross-section.

References Cited
UNITED STATES PATENTS

| | | | |
|---|---|---|---|
| 1,022,186 | 4/1912 | Engler | 273—96 |
| 2,029,790 | 2/1936 | Philipp | 273—96 |
| 3,208,182 | 9/1965 | Holthaus | 43—41.2 |
| 1,473,507 | 11/1923 | Obermaier | 43—19 |
| 1,764,738 | 6/1930 | Marsters | 43—41.2 |
| 2,260,705 | 10/1941 | Eguchi | 43—41.2 |
| 2,292,743 | 8/1942 | Cordry | 43—41.2 |
| 3,115,129 | 12/1963 | Merriman | 124—5 |
| 3,163,957 | 1/1965 | Barrett | 43—41.2 |

FOREIGN PATENTS

| | | |
|---|---|---|
| 166,487 | 3/1959 | Sweden. |
| 569,170 | 1/1924 | France. |

SAMUEL KOREN, Primary Examiner

D. J. LEACH, Assistant Examiner

U.S. Cl. X.R.
43—41.2, 43.12; 124—5; 273—96